April 14, 1964 R. PERLEY 3,129,406

DIGITAL SIGNAL COMPARISON CIRCUIT

Filed Feb. 29, 1960

INVENTOR.

RICHMOND PERLEY

BY

ATTORNEY

United States Patent Office 3,129,406

Patented Apr. 14, 1964

3,129,406
DIGITAL SIGNAL COMPARISON CIRCUIT

Richmond Perley, Glastonbury, Conn., assignor to United Aircraft Corporation, East Hartford, Conn., a corporation of Delaware Filed Feb. 29, 1960, Ser. No. 11,617
1 Claim. (Cl. 340—146.1)

My invention relates to a digital signal comparison circuit and more particularly to an improved circuit responsive to logic voltages each having a first value in one state and a second value in another state for indicating whether the number of input voltages of one or the other of said states is odd or is even.

In the art of handling digital quantities represented by groups of logic voltages each having a first value in one state and having another value in a second state groups of voltages representing the quantities are often transferred in parallel. In such a system where, for example, respective characters are represented by a plurality of groups of voltages which voltages are shifted in parallel group-by-group to an information handling unit a parity channel carries recorded voltages so arranged as to produce a record in which each group of voltages representing a character has either an odd number or an even number of voltages of one of the states. For such a parity channel to serve as a useful check on the information being handled it is, of course, necessary that some means be provided for checking the oddness or the evenness of the number of voltages of one or the other states in each character. One system which has been suggested for checking each character is to store the voltage representations corresponding to a character as they are shifted in parallel out of a register or the like and then to feed them serially to a counter, the final condition of which represents whether or not the character contains an even number or an odd number of voltages of a particular state.

The system described above for checking the oddness or evenness of the number of voltages of a particular type representing a character of information embodies a number of disadvantages. First, relatively complicated circuitry having a large number of individual components is required for first storing the logic voltages representing the character and then transferring the stored logic voltages serially to a counter. Further, this system of checking the information is not as rapid as is desirable for many high speed installations. Other systems of the prior art require as inputs not only the logic voltages representing a character but also complements of these voltages and thus include a very large number of individual components.

I have invented a digital signal comparison circuit for rapidly and simply determining whether or not two input signals are the same or are different. My circuit is simpler and consequently more reliable than are circuits of the prior art intended for this use. My circuit requires as inputs only the logic voltages representing a character and does not require any complementary signals. My circuit is especially adapted for use in a system which provides a parity check on digital information to determine the oddness or the evenness of the number of logic voltages of one state or the other in characters being transferred. My comparison circuit provides this parity check in a more rapid and expeditious manner than do systems of the prior art intended for this purpose.

One object of my invention is to provide a digital signal comparison circuit for determining whether or not two input voltages are the same or are different.

Another object of my invention is to provide a digital signal comparison circuit which may be employed to make a parity check for determining whether or not a group of input logic voltages contain an odd number or an even number of voltages of one of two states.

A further object of my invention is to provide a digital signal comparison circuit for use in a parity checking system which operates in a rapid and expeditious manner.

Still another object of my invention is to provide a digital signal comparison circuit for use in a parity checking system which is simpler and more reliable than parity checking systems of the prior art.

A still further object of my invention is to provide a digital signal comparison circuit for use in a parity checking system having a substantially smaller number of components than do similar systems of the prior art.

Other and further objects of my invention will appear from the following description.

In general my invention contemplates the provision of a digital signal comparison circuit employing a pair of electronic devices each having a control element and each adapted to assume a conductive condition and a nonconductive condition. I normally bias the device to one of the two conditions and apply respective logic voltages each having a first value in one state and a second value in another state to the control elements of the devices. I so interconnect the devices that one of the two devices changes its condition when the logic voltages are in different states. A common output terminal carries a signal which indicates when either of the two devices changes its condition to indicate that the two input logic voltages are different.

In the accompanying drawings which form part of the instant specification and which are to be read in conjunction therewith and in which like reference numerals are used to indicate like parts in the various views.

Figure 1:
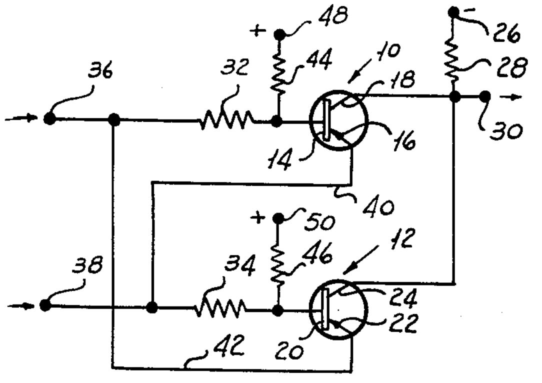
FIGURE 1 is a schematic view of one form of my digital signal comparison circuit.

Referring now more particularly to FIGURE 1 of the drawings, my digital signal comparison circuit includes a pair of respective transistors, indicated generally by the reference characters 10 and 12, which may, in one form of my invention, be p-n-p transistors. Transistor 10 includes a pair of respective transistors, indicated generally by the reference characters 10 and 12, which may, in one form of my invention, be p-n-p transistors. Transistor 10 includes a base 14, an emitter 16, and a collector 18; while the transistor 12 has a base 20, an emitter 22, and a collector 24. I connect both collectors 18 and 24 to the terminal 26 of a suitable source of potential through a collector resistor 28. Output terminal 30 is connected to the common terminal of the collectors 18 and 20. Respective emitter-to-base current limiting resistors 32 and 34 connect input logic voltage terminals 36 and 38 to the bases 14 and 20. A conductor 40 connects input terminal 38 to the emitter 16 of transistor 10. A conductor 42 connects input terminal 36 to the emitter 22 of transistor 12.

Let us assume that each of the logic voltages applied to the terminals 36 and 38 has a value of substantially zero to represent a "0" in the binary code in one state and a negative value representing a "1" in the binary code in another state. Let terminal 26 be the terminal of a source of negative potential. If both signals applied to the terminals 36 and 38 represent "0's" with the result that the terminals are at a potential of zero volts, the emitter-to-base voltage of both the transistors 10 and 12 is zero with the result that neither transistor conducts.

If both the signals applied to terminals 36 and 38 are at the level of negative potential corresponding to a "1" in the binary code, owing to the terminals 36 and 38 are at the level of negative potential corresponding to a "1" in the binary code, owing to the interconnection between the two transistors 10 and 12, the emitter-to-base potential of both transistors again will be zero and neither transistor will conduct. Thus the negative potential at the output terminal will be the same as the potential of the source connected to terminal 26 indicating that both input signals are in the same state.

Assume now that the logic voltage applied to terminal 36 is at the negative level which represents a "1" while the signal applied to terminal 38 is at substantially zero volts, representing a "0." In this condition of the input logic voltages, the emitter-to-base voltage of transistor 10 is such that the transistor conducts, while the emitter-to-base voltage of transistor 12 is such that the transistor is cut off. By proper selection of circuit parameters in this condition of the input signals the transistor 10 saturates and its emitter-to-collector voltage drop is only a few tenths of a volt so that the output terminal 30 is at substantially zero volts. It will be apparent that if the logic voltage at terminal 36 represents a "0" while the logic voltage at terminal 38 represents a "1," transistor 12 will conduct and transistor 10 will be cut off. Again terminal 30 will be at substantially zero volts. From the foregoing explanation, it will be seen that a potential of substantially zero volts at the output terminal 30 indicates that the two logic input voltages are in different states.

For the foregoing explanation I have assumed that when the two logic voltage inputs to terminals 36 and 38 are in the same state they have exactly the same value. Owing to the normal tolerances in electronic circuits, the negative values of these signals, representing "1's," may be slightly different to permit one of the two transistors 10 and 12 to conduct slightly though it should not. I provide my circuit with means for counteracting this effect. I connect respective biasing resistors 44 and 46 between terminals 48 and 50 of a source of positive biasing potential of appropriate magnitude and the respective bases 14 and 20. Owing to these connections even when the two logic voltage inputs are equal, the emitter-to-base voltages will be slightly negative and neither transistor can conduct. That is, the respective logic voltage inputs must differ by some significant amount before either of the two transistors 10 and 12 can conduct.

In the explanation of my digital signal comparison circuit thus far I have stated that my circuit indicates whether or not two logic circuit voltages are in the same state or are in different states. It may also be said that my digital signal comparison circuit indicates when the total number of "1's" represented by negative voltages on the inputs is even or when the total number of "1's" is odd. This characteristic of my digital signal comparison circuit has its particular use in performing parity checks as will be explained in detail hereinafter.

Figure 3:
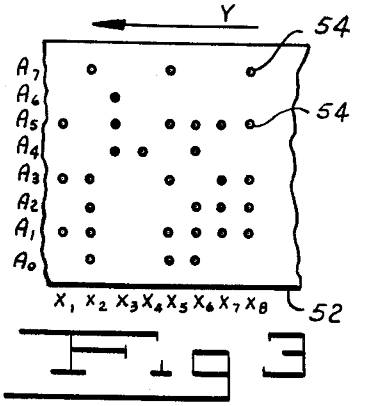
FIGURE 3 is a fragmentary plan view illustrating a length of magnetic tape or the like on which logic voltages representing information characters are recorded.

Referring now to FIGURE 3, I have, by way of example, shown a magnetic tape 52 carrying digital information on which a parity check is to be made. The information is recorded on the tape 52 in a plurality of longitudinally extending channels $A_0$ to $A_7$. Groups of recorded voltages in corresponding places of the channels represent a plurality of characters spaced along the length of the tape. By way of example, I have shown eight characters $X_1$ to $X_8$ represented by rows extending transversely of the tape. Conveniently the information may be recorded in the form of logic circuit voltages in positions corresponding respectively to the intersection of the channels and the character rows. A "1" in any particular position is represented by a negative voltage which I have indicated as a recorded dot 54 in FIGURE 3. A "0" in any position is represented by the absence of a dot. In one form of the information recorded on the tape 52 the channels $A_0$ to $A_6$ may represent information while the channel $A_7$ may be a parity channel in which "1's" are recorded to result in an arrangement in which each of the characters $X_1$ to $X_8$ contains an odd number of "1's." Let us further assume that the tape 52 is being moved in the direction of the arrow Y in FIGURE 3 past a suitable reading device or devices which read the channels in parallel with the result that the logic voltages of each group representing a character are read in parallel while the groups representing the respective characters are read in sequence from the tape. From the foregoing explanation it will be apparent that if the parity channel $A_7$ is to afford a useful check some means must be provided for determining whether or not the number of "1's" in each character is odd.

Figure 2:
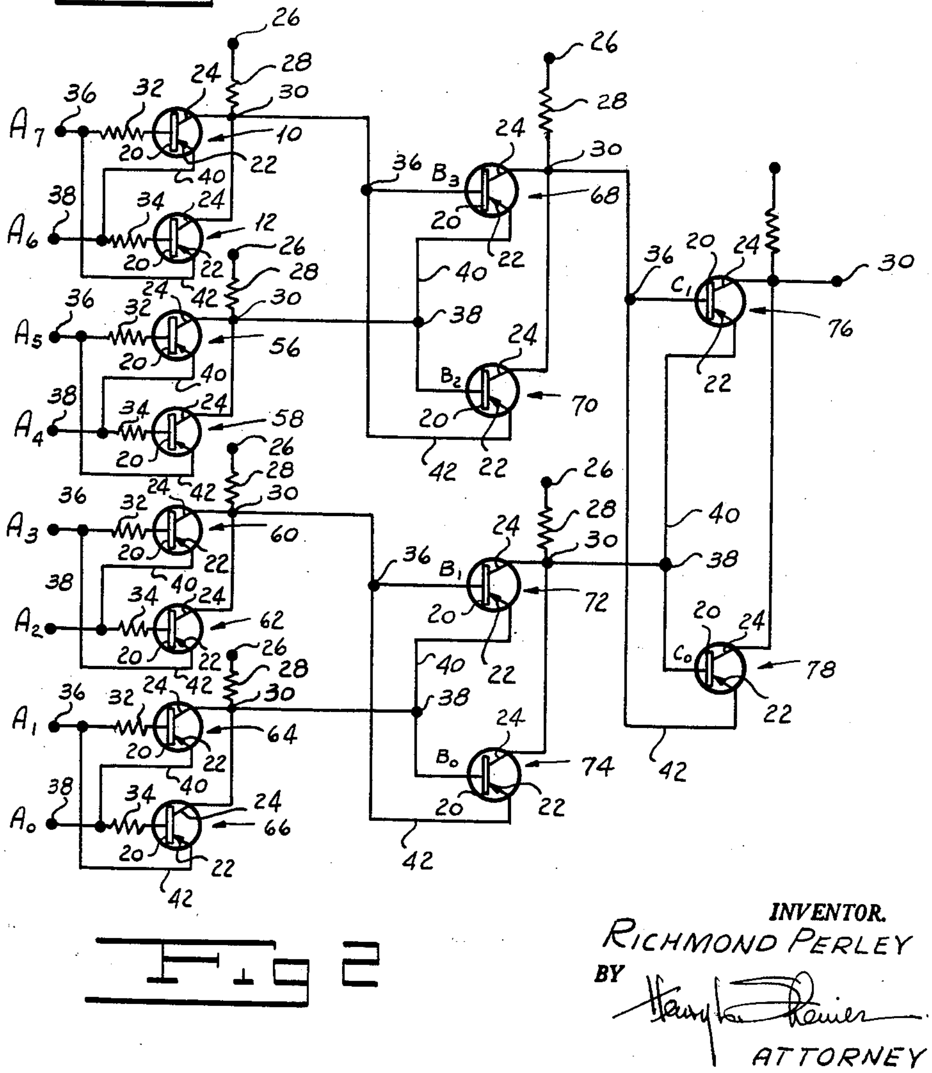
FIGURE 2 is a schematic view of my digital signal comparison circuit embodied in a parity checking system arranged to check characters which may be represented by eight logic voltages.

Referring now to FIGURE 2, I have shown my digital signal comparison circuit embodied in a system for determining whether or not a plurality of logic input voltages contain an odd or an even number of logic voltages of one of two states. In this system I apply the potential at the output terminal 30 of a pair of interconnected transistors such as the transistors 10 and 12 to the input terminal 36 of a transistor 68 of a pair of transistors 68 and 70 interconnected in the manner described hereinabove in connection with transistors 10 and 12. I connect the output terminal 30 of a pair of similarly connected transistors 56 and 58 to the input terminal 38 of transistor 70. Respective pairs of transistors 60 and 62 and 64 and 66 have output terminals 30 connected to the respective input terminals 36 and 38 of a pair of transistors 72 and 74. I apply the outputs of the respective pairs of transistors 68 and 70 and 72 and 74 to the input terminals 36 and 38 of a pair of transistors 76 and 78. It is to be understood that all the pairs of transistors 60 and 62, 64 and 66, 72 and 74 and 76 and 80 are connected in the same manner as is set forth hereinabove in connection with transistors 10 and 12. Since the individual elements of the circuits of these pairs of transistors are substantially the same as the elements of the circuits of the pair of transistors 10 and 12 I have indicated the individual elements in FIGURE 2 by the same reference characters as those used for the elements in FIGURE 1. Since the resistors 32 and 34 in the input circuits of transistors 10, 12, 56, 58, 60, 62, 64 and 66 properly limit the emitter-to-base currents of these transistors current limiting resistors are not necessary in the circuits of transistors 68, 70, 72, 74, 76 and 78. I may provide biasing circuits including resistors 44 and 46 for the transistors of FIGURE 2 if desired.

In any suitable manner, I apply the outputs from the reading devices (not shown) associated with the respective channels $A_7$ to $A_0$ to the input terminals 36 and 38 of the pairs of transistors 10 and 12, 56 and 58, 60 and 62, and 64 and 66 shown in FIGURE 2. Let us assume that the recorded logic voltages representing the character $X_1$ are being applied to the input terminals 36 and 38 of the system shown in FIGURE 2. From FIGURE 3 it can be seen that the character $X_1$ has recorded pulses representing "1's" only in the channels $A_5$, $A_3$, and $A_1$ making a total number of "1's" which is odd. It will further be seen that with this character being applied to the system of FIGURE 2 the input terminals 36 of transistors 56, 60 and 64 carry voltages having negative values representing "1's" while all the remaining terminals 36 and 38 are at the level of substantially zero volts representing "0's." Since the inputs to both transistors 10 and 12 are the same, the output of this pair of transistors remains at the negative level of the source at terminal 26. Since the inputs to the remaining pairs of transistors 56 and 58, 60 and 62, and 64 and 66 are different, the output terminals 30 of these pairs all are at a potential of substantially zero volts. With these conditions prevailing the inputs to transistors 68 and 70 are different with the result that its output terminal 30 is at substantially zero volts. At the same time the inputs to transistors 72 and 74 are the same with the result that the output terminal 30 of this pair is at the negative potential of the source at terminal 26. It will be seen that the inputs to the transistors 76 and 78 are different with the result that the potential at the output terminal 30 of this pair is at ground indicating that logic voltages representing an odd number of "1's" have been applied to the input terminals of the system in FIGURE 2. For purposes of further explanation of the operation of the parity-indicating system shown in FIGURE 2, I have indicated the inputs to the respective transistors 68, 70, 72 and 74 as $B_3$ to $B_0$ and I have indicated the inputs to transistors 76 and 78 as $C_1$ and $C_0$. In Table I below I have shown the level of the various inputs to the transistors of FIGURE 2 as the representations of the characters $X_1$ to $X_8$ which are applied to the system of FIGURE 3.

*Table I*

| | $A_7$ $A_6$ | $A_5$ $A_4$ | $A_3$ $A_2$ | $A_1$ $A_0$ | $B_3$ $B_2$ | $B_1$ $B_0$ | $C_1$ $C_0$ |
|---|---|---|---|---|---|---|---|
| $X_1$ | — | 0 | 0 | 0 | 0 | — | 0 |
| $X_2$ | 0 | — | — | — | 0 | — | 0 |
| $X_3$ | 0 | — | — | — | 0 | — | 0 |
| $X_4$ | — | 0 | — | — | 0 | — | 0 |
| $X_5$ | 0 | 0 | 0 | — | — | 0 | 0 |
| $X_6$ | — | — | 0 | — | — | 0 | 0 |
| $X_7$ | — | 0 | — | 0 | 0 | 0 | — |
| $X_8$ | 0 | 0 | — | 0 | — | 0 | 0 |

From FIGURE 3 it can be seen that each of the characters $X_1$ to $X_6$ and $X_8$ contains an odd number of "1's." From Table I it can be seen that as these characters successively are applied to the circuit of FIGURE 2, the output at the terminal 30 of the pair of transistors 76 and 78 always is at a level of substantially zero volts indicating that no parity error exists. It will be noted that the character $X_7$ includes four "1's," an even number. When this character is applied to the system of FIGURE 2, it will be seen that the output at terminal 30 of the pair of transistors 76 and 78 is at the negative level of the source at terminal 26 and a parity error is indicated. In this manner an extremely rapid and accurate parity check of digital information can be made with a minimum number of components. Systems of the prior art require many more elements.

It is to be noted that while I have shown a form of my digital signal comparison circuit which employs p-n-p transistors, I could as well employ n-p-n transistors merely by reversing the polarities of potentials shown.

In operation of my digital signal comparison circuit when the logic voltage inputs applied to the terminals 36 and 38 of the pair of transistors 10 and 12, for example, are the in same state the emitter-to-base voltages of the two transistors are substantially zero with the result that neither transistor conducts and the output terminal 30 of the pair is at the negative level of the potential connected to terminal 26 thus indicating that the two inputs have the same value. When the logic voltage input at terminal 36, for example, is at a negative level representing a "1" while the logic voltage input to terminal 38 is at a level of substantially zero volts transistor 10 conducts while transistor 12 is cut off. By proper selection of the circuit parameters transistor 10 saturates and its emitter-to-collector voltage has a very small value with the result that terminal 30 is at substantially zero volts indicating that the inputs to terminals 36 and 38 are different. In a similar manner when the logic voltage applied to terminal 38 has a negative value representing a "1" while the logic voltage applied to terminal 36 is at substantially zero volts, transistor 12 saturates while transistor 10 is cut off and terminal 30 again is at substantially zero volts indicating that the two inputs at terminals 36 and 38 have different states. When my circuit is embodied in a parity checking system such as that shown in FIGURE 2 it operates in the manner described above in connection with Table I to indicate whether or not the number of inputs of one state is odd or is even.

It will be seen that I have accomplished the objects of my invention. I have provided a digital signal comparison circuit for indicating whether or not a pair of logic input voltages are in the same state or are in different states. I have provided a parity checking system for determining whether or not a number of logic voltages include a number of voltages representing an odd number of "1,s" or "0,s" or an even number of "1's" or "0's." My circuit does not require complementary inputs as do other circuits of the prior art. My circuit is simpler and hence more reliable than are circuits of the prior art since it requires a great many less components than do systems of the prior art. My circuit is adapted to be embodied in a parity checking system for handling a large number of inputs in parallel. A parity checking system made up from my circuit operates much more rapidly than do parity checking systems of the prior art.

It will be understood that certain features and subcombinations are of utility and may be employed without reference to other features and subcombinations. This is contemplated by and is within the scope of my claim. It is further obvious that various changes may be made in details within the scope of my claim without departing from the spirit of my invention. It is, therefore, to be understood that my invention is not to be limited to the specific details shown and described.

Having thus described my invention, what I claim is:

A parity checking circuit including in combination a first and a second source of two-state voltage, a first and a second transistor each having a base and an emitter and a collector, means connecting both collectors to provide an output, first low resistance means connecting the first source to the emitter of the first transistor, second low resistance means connecting the second source to the emitter of the second transistor, first high resistance means independent of any fixed biasing source for connecting the first source to the base of the second transistor, and second high resistance means independent of any fixed biasing source for connecting the second source to the base of the first transistor.

References Cited in the file of this patent

UNITED STATES PATENTS

| | | |
|---|---|---|
| 2,627,039 | MacWilliams | Jan. 27, 1953 |
| 2,674,727 | Spielberg | Apr. 6, 1954 |
| 2,831,987 | Jones | Apr. 22, 1958 |
| 2,848,607 | Maron | Aug. 19, 1958 |
| 2,946,897 | Mayo | July 26, 1960 |
| 2,967,951 | Brown | Jan. 10, 1961 |
| 3,046,523 | Batley | July 24, 1962 |

OTHER REFERENCES

Publication: Proceedings of IRE, June 1958, p. 1250.

Notice of Adverse Decision in Interference

In Interference No. 94,707 involving Patent No. 3,129,406, R. Perley, DIGITAL SIGNAL COMPARISON CIRCUIT, final judgment adverse to the patentee was rendered Oct. 22, 1965, as to claim 1.

[*Official Gazette December 14, 1965.*]